(12) United States Patent
Richter

(10) Patent No.: US 11,566,651 B2
(45) Date of Patent: Jan. 31, 2023

(54) JOURNAL BEARING WITH OFFSET BORES FOR CENTERING A MISALIGNED PIN

(71) Applicant: The Boeing Company, Chicago, IL (US)

(72) Inventor: Gary L Richter, Port Orchard, WA (US)

(73) Assignee: THE BOEING COMPANY, Chicago, IL (US)

( * ) Notice: Subject to any disclaimer, the term of this patent is extended or adjusted under 35 U.S.C. 154(b) by 78 days.

(21) Appl. No.: 15/930,320

(22) Filed: May 12, 2020

(65) Prior Publication Data
US 2021/0355989 A1 Nov. 18, 2021

(51) Int. Cl.
*F16B 9/00* (2006.01)
*F16B 1/00* (2006.01)

(52) U.S. Cl.
CPC ...... *F16B 9/056* (2018.08); *F16B 2001/0092* (2013.01)

(58) Field of Classification Search
CPC .. F16B 2001/0092; F16B 9/052; F16B 9/056; Y10T 403/1616; Y10T 403/1624; Y10T 403/4637; Y10T 403/7047; Y10T 403/7051; Y10T 403/7052; Y10T 403/7058; Y10T 403/7061; Y10T 403/32893; Y10T 403/32901; F16C 23/02; F16C 25/02
USPC .......... 384/95, 114, 129, 166, 183, 261, 428
See application file for complete search history.

(56) References Cited

U.S. PATENT DOCUMENTS

| | | | | |
|---|---|---|---|---|
| 602,287 A * | 4/1898 | Green | ................... | F16C 25/02 403/350 |
| 1,565,264 A * | 12/1925 | Dubi | ................... | F16C 3/28 74/570.21 |
| 2,182,162 A * | 12/1939 | Karl | ................... | B23D 35/001 83/528 |
| 3,046,825 A * | 7/1962 | Thompson | ........... | B23D 35/002 100/98 R |
| 4,231,671 A * | 11/1980 | Makins, Jr. | ................ | F16C 3/18 403/13 |
| 4,309,123 A * | 1/1982 | Moore | ................... | B25B 15/02 29/240 |

(Continued)

FOREIGN PATENT DOCUMENTS

| WO | WO-9849453 A1 * | 11/1998 | ............ | F16B 7/1427 |
|---|---|---|---|---|
| WO | WO-0067963 A1 * | 11/2000 | ............ | B25J 19/063 |

*Primary Examiner* — Josh Skroupa
*Assistant Examiner* — Zachary A Hall
(74) *Attorney, Agent, or Firm* — Vivacqua Crane, PLLC

(57) ABSTRACT

A journal bearing for centering a misaligned pin is disclosed. The journal bearing includes an outer bushing defining an outer bore. The outer bore is offset with respect to an axis of rotation of the journal bearing by a misalignment distance. The misalignment distance represents a distance between the axis of rotation of the journal bearing and a center axis of the misaligned pin. The journal bearing further includes an inner bushing defining an inner bore. The inner bore is offset with respect to the axis of rotation of the journal bearing by the misalignment distance. The inner bushing is seated within the outer bore of the outer bushing. The inner bushing and the outer bushing are both configured to rotate relative to one another to center an inner periphery of the inner bushing around the misaligned pin.

20 Claims, 7 Drawing Sheets

(56) References Cited

U.S. PATENT DOCUMENTS

| | | | | |
|---|---|---|---|---|
| 4,338,036 A | * | 7/1982 | DeLeu | F16D 1/096 403/16 |
| 4,749,898 A | * | 6/1988 | Suzuki | B23Q 1/5481 310/114 |
| 6,857,781 B1 | * | 2/2005 | Sakamoto | F04D 29/061 384/114 |
| 7,344,108 B2 | * | 3/2008 | Muylaert | B64C 1/062 244/115 |
| 8,967,870 B2 | * | 3/2015 | Ishii | F16C 33/22 384/129 |

* cited by examiner

JOURNAL BEARING WITH OFFSET BORES FOR CENTERING A MISALIGNED PIN

INTRODUCTION

The present disclosure relates to a journal bearing. More particularly, the present disclosure is directed towards a journal bearing with offset bores for centering a misaligned pin.

BACKGROUND

The fuselage of a passenger aircraft is divided into an upper portion, which includes areas such as a flight deck and a passenger cabin, and a lower portion. The lower portion of the fuselage may be referred to as a lower lobe. The lower lobe of the fuselage may be used to store electrical equipment and cargo. Specifically, the lower lobe of the fuselage includes an avionics bay for housing electrical equipment racks. A bottom portion of the electrical equipment racks are anchored in place to the lower lobe structure of the fuselage, while an upper portion of the electrical equipment racks are connected to a shear plate that is part of a floor support.

The electrical equipment racks allow for relative vertical movement between a horizontally extending shear plate and the lower lobe of the fuselage while supporting horizontal loads. Specifically, one or more shear pins are disposed on the upper portion of an electrical equipment rack. The shear pins of the rack are received by corresponding openings located in the shear plate. For various reasons, there is often lateral misalignment between the shear pin of the rack and the floor shear plate. Accordingly, a bushing is placed between the shear pin and the floor sheet plate and is supposed to accommodate any misalignment. However, in many instances, the bushing experiences interference pre-loads due to excessive misalignment between the floor shear plate and the electrical equipment rack. As a result, the bushing often becomes deformed and may create objectionable sounds, such as popping noises, when the aircraft is in flight.

SUMMARY

According to several aspects, a journal bearing for centering a misaligned pin is disclosed. The journal bearing includes an outer bushing defining an outer bore, where the outer bore is offset with respect to an axis of rotation of the journal bearing by a misalignment distance. The misalignment distance represents a distance between the axis of rotation of the journal bearing and a center axis of the misaligned pin. The journal bearing also includes an inner bushing defining an inner bore and an inner periphery that surrounds the inner bore, where the inner bore is offset with respect to the axis of rotation of the journal bearing by the misalignment distance. The inner bushing is seated within the outer bore of the outer bushing, and the inner bushing and the outer bushing are both configured to rotate relative to one another to center the inner periphery of the inner bushing around the misaligned pin.

In another aspect, a journal bearing assembly includes a misaligned pin having a center axis and a shear plate defining an opening for receiving the misaligned pin and a counterbore that surrounds the opening. The journal bearing assembly includes a journal bearing, and the journal bearing includes an outer bushing seated within the counterbore of the shear plate. The outer bushing defines an outer bore that is offset with respect to an axis of rotation of the journal bearing by a misalignment distance. The misalignment distance represents a distance between the axis of rotation of the journal bearing and the center axis of the misaligned pin. The journal bearing also includes an inner bushing defining an inner bore and an inner periphery that surrounds the inner bore. The inner bore is offset with respect to the axis of rotation of the journal bearing by the misalignment distance. The inner bushing is seated within the outer bore of the outer bushing, and the inner bushing and the outer bushing are both configured to rotate relative to one another to center the inner periphery of the inner bushing around the misaligned pin and remove the pre-load force against the shear plate.

In yet another aspect, a method of centering a misaligned pin with a journal bearing is disclosed. The method includes loosening one or more bushing retainers that are disposed around an outer periphery of an outer bushing of the journal bearing, where the one or more bushing retainers clamp the outer bushing and the inner bushing against a shear plate. The method also includes rotating the outer bushing. The outer bore is offset with respect to an axis of rotation of the journal bearing by a misalignment distance, where the misalignment distance represents a distance between an axis of rotation of the journal bearing and a center axis of the misaligned pin. The method also includes rotating an inner bushing relative to the outer bushing. The inner bore is offset with respect to the axis of rotation of the journal bearing by the misalignment distance. The inner bushing is seated within the outer bore of the outer bushing. The method also includes centering an inner periphery of the inner bushing around the misaligned pin, where centering the misaligned pin removes a pre-load force against the shear plate. Finally, the method includes tightening the one or more bushing retainers disposed around the outer periphery of the outer bushing of the journal bearing.

The features, functions, and advantages that have been discussed may be achieved independently in various embodiments or may be combined in other embodiments further details of which can be seen with reference to the following description and drawings.

BRIEF DESCRIPTION OF THE DRAWINGS

The drawings described herein are for illustration purposes only and are not intended to limit the scope of the present disclosure in any way.

DETAILED DESCRIPTION

The present disclosure is directed towards a journal bearing for centering a shear pin, where the shear pin is misaligned with respect to an opening in a shear plate. The journal bearing includes an inner bushing, an outer bushing, and a pin guide. The outer bushing of the journal bearing includes an outer bore that is offset with respect to an axis of rotation of the journal bearing and an outer counterbore that is aligned with the axis of rotation of the journal bearing. The inner bushing includes an inner bore and an inner lip that are both offset with respect to the axis of rotation of the journal bearing. The inner lip of the inner bushing is seated within the outer bore of the outer bushing of the journal bearing. The inner bushing and the outer bushing are both configured to rotate relative to one another to center an inner periphery of the inner bushing around the shear pin. It is to be appreciated that the shear pin exerts an unwanted pre-load force against the pin guide when misaligned. Specifically, the pre-load force is translated from the pin guide to the inner bushing, from the inner bushing to the outer bushing, and from the outer bushing to an outer surface of the opening in the shear plate. Centering the shear pin removes the pre-load force from the shear plate.

The following description is merely exemplary in nature and is not intended to limit the present disclosure, application, or uses.

Figure 1:
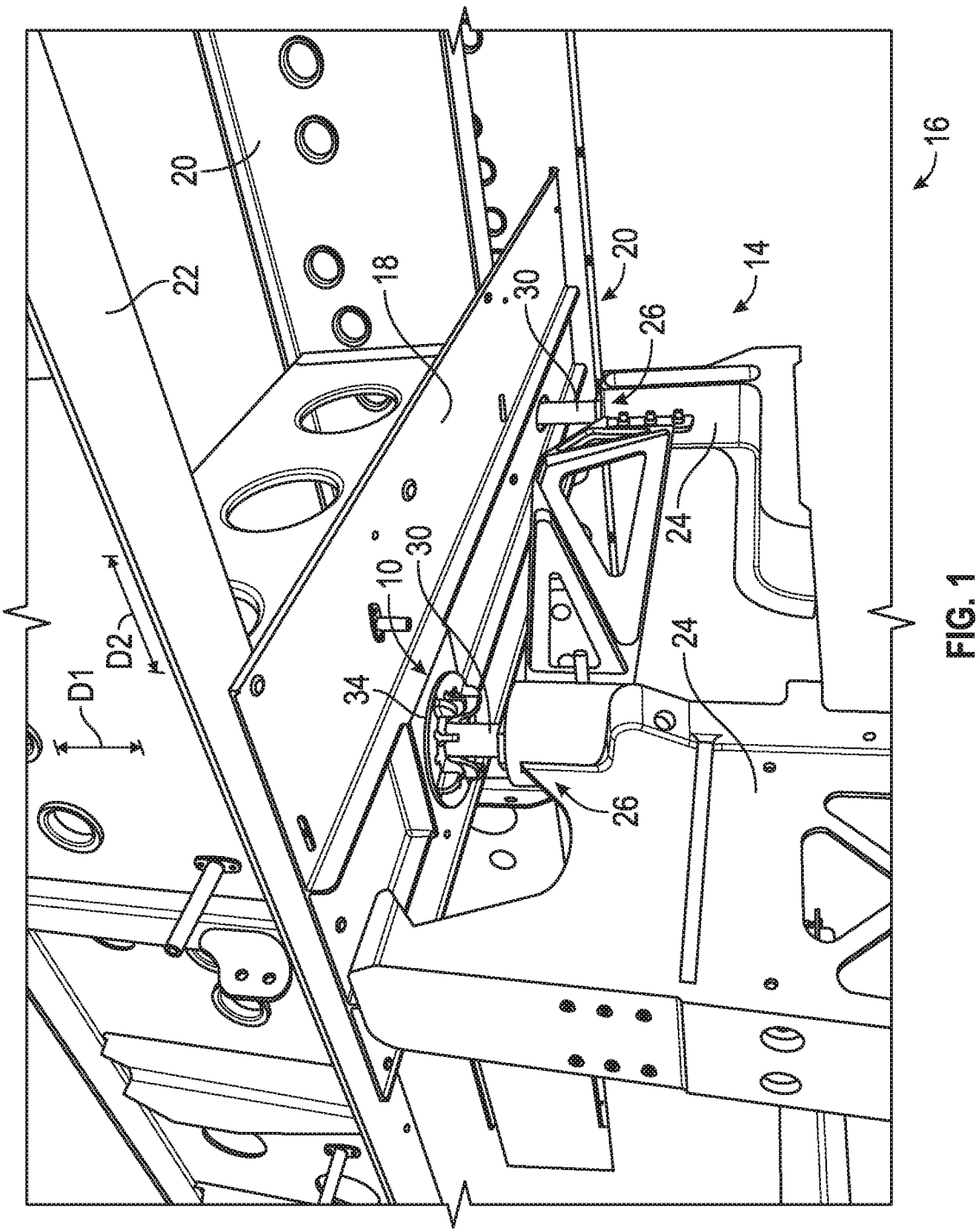
FIG. 1 is a perspective view of a portion of a fuselage of an aircraft including a plurality of floor beams, a plurality of rack supports, a shear plate, and the disclosed journal bearing, according to an exemplary embodiment.

Referring to FIG. 1, a perspective view of a journal bearing assembly 10 located within a fuselage 14 of an aircraft 16 is shown. The journal bearing assembly 10 is located below a shear plate 18. The shear plate 18 is part of a floor support structure 20 of the aircraft 16. The shear plate 18 may be disposed between a plurality of horizontally extending floor beams 22 and a plurality of rack supports 24. In one example, the rack supports 24 are electrical equipment racks that each include an upper end portion 26 and a lower end portion (not visible in FIG. 1), where the lower end portion of the rack supports 24 are attached to a lower lobe frame (not shown in FIG. 1) of the fuselage 14. The rack supports 24 move relative to the floor support structure 20 in a vertical direction D1 and may translate in an up and down direction relative to the journal bearing assembly 10. However, the rack supports 24 are fixed in a horizontal direction D2 and are configured to support horizontal loads. A shear pin, which is referred to as a misaligned pin 30, is located on the upper end portion 26 of the rack support 24. The misaligned pin 30 is received by a corresponding opening 32 (FIG. 2) that is defined by the shear plate 18. The journal bearing assembly 10 includes the shear plate 18, the misaligned pin 30, and a journal bearing 34.

Figure 2:
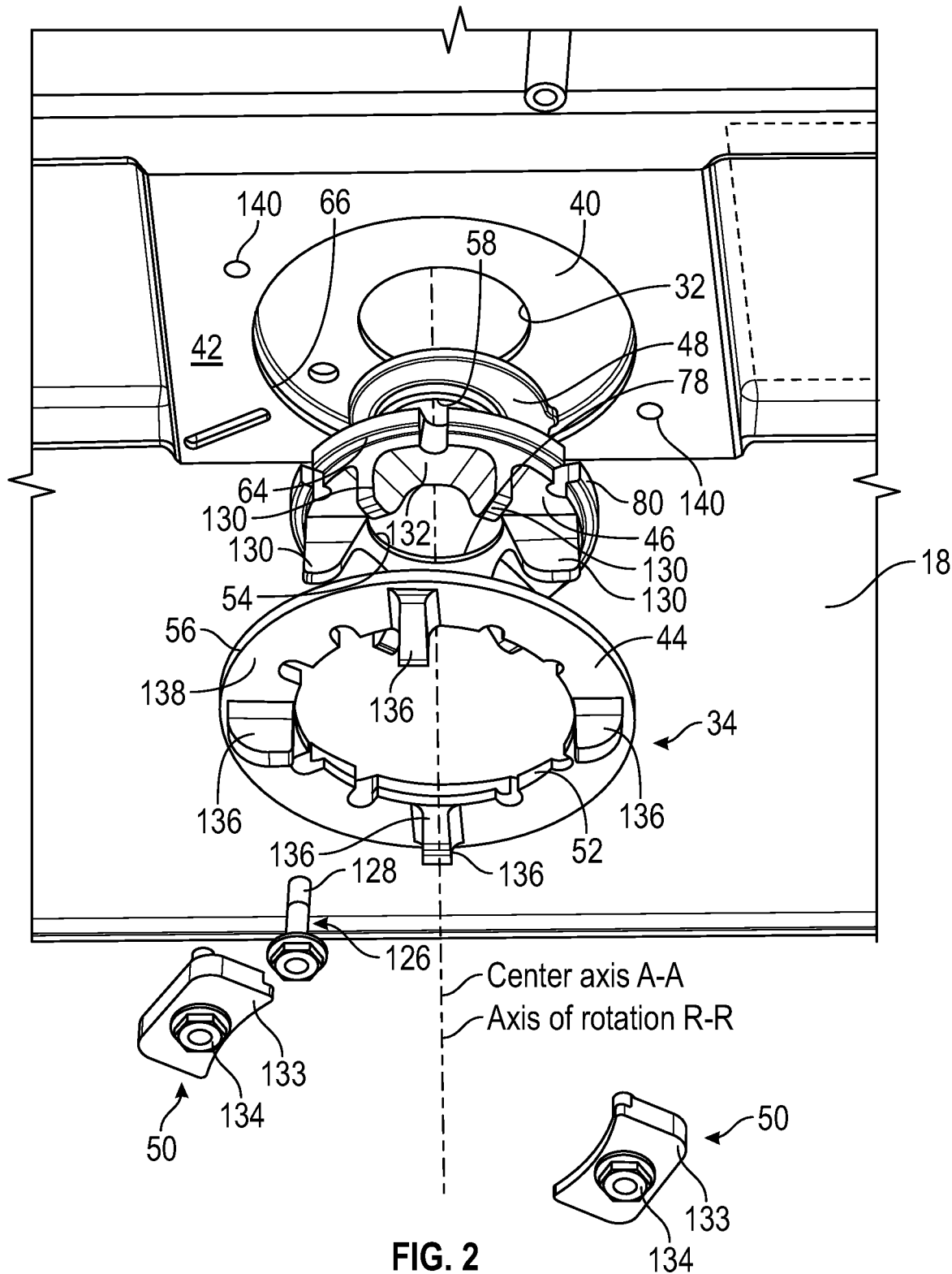
FIG. 2 is an exploded view of the journal bearing and the shear plate shown in FIG. 1, according to an exemplary embodiment.

FIG. 2 is an exploded view of the journal bearing assembly 10. As seen in FIG. 2, the opening 32 defined by the shear plate 18 includes a center axis A-A. The journal bearing 34 includes an axis of rotation R-R, where the center axis A-A of the opening 32 and the axis of rotation R-R of the journal bearing 34 are aligned with one another. The journal bearing 34 includes an outer bushing 44 defining an outer bore 52 and an outer counterbore 62 (the outer counterbore 62 is visible in FIGS. 3 and 4). The journal bearing 34 also includes an inner bushing 46 defining an inner bore 54 and an inner lip 64, a pin guide 48 defining an opening 58, and one or more bushing retainers 50. In the non-limiting embodiment as shown in the figures, the journal bearing 34 includes two bushing retainers 50. The shear plate 18 defines a counterbore 40, where the counterbore 40 surrounds and is concentric with the opening 32 located in the shear plate 18. The counterbore 40 is disposed along a bottom surface 42 of the shear plate 18 and is shaped to receive the journal bearing 34. Specifically, the outer counterbore 62 (FIGS. 2 and 3) of the outer bushing 44 of the journal bearing 34 corresponds to an outer periphery 56 of the outer bushing 44, where the outer counterbore 62 of the outer bushing 44 is seated against the counterbore 40 of the shear plate 18. It is to be appreciated that vertical loads realized by the rack supports 24 are translated into the lower lobe of the fuselage 14, and horizontal loads partially translate through the misaligned pin 30 and the journal bearing assembly 10 and the journal bearing assembly 10 to the floor support structure 20 of the aircraft 16.

Figure 3:
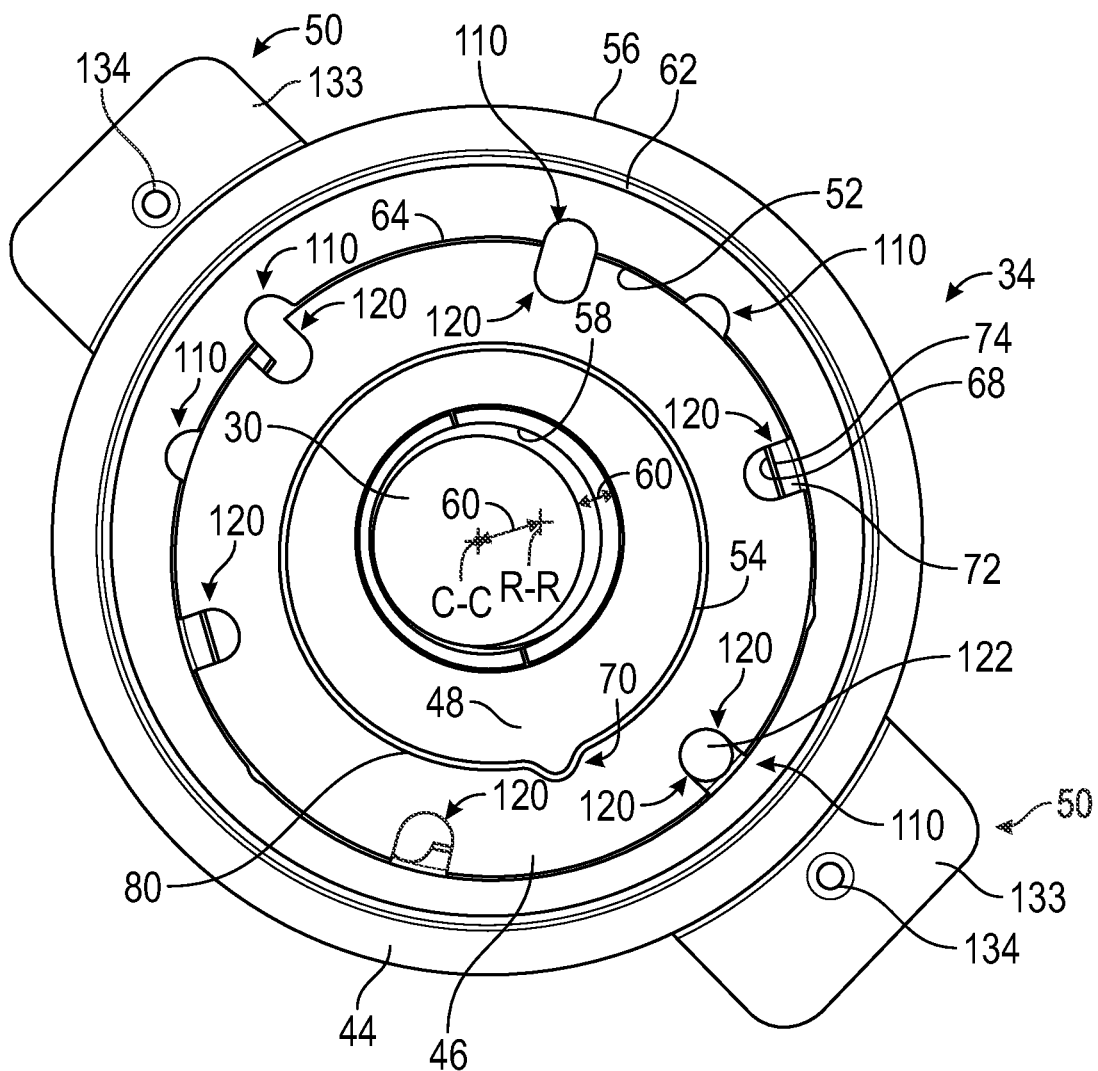
FIG. 3 is a top view of the journal bearing, where the shear plate has been omitted, according to an exemplary embodiment.

Referring to FIGS. 2 and 3, it is to be appreciated that sometimes the misaligned pin 30 may not be centered within the opening 32 of the shear plate 18. As a result, the misaligned pin 30 exerts a pre-load force against the pin guide 48, which is transferred to the inner bushing 46, and is then transferred outer bushing 44. Referring to FIGS. 2-3, the outer bushing 44 transfers the pre-load force against an outer surface 66 of the counterbore 40 of the shear plate 18. As explained below, the inner bushing 46 and the outer bushing 44 of the journal bearing 34 are rotated relative to one another to center an inner periphery 78 (seen in FIG. 2) of the inner bushing 46 around the misaligned pin 30, which removes the pre-load force exerted against the shear plate 18.

In the embodiment as shown in FIGS. 1 and 2, the journal bearing 34 is an overhead support joint that is located in the floor support structure 20 of the aircraft 16. It is to be appreciated that journal bearing 34 retains all components during the adjustment procedure, and therefore may be especially advantageous when used in an overhead application. However, it is to be appreciated that the disclosed journal bearing 34 may be used in any application where a misaligned pin is accommodated. For example, the disclosed journal bearing 34 may employed by doors, monuments, or a galley of an aircraft. Furthermore, it is also to be appreciated that the disclosed journal bearing 34 is not limited to an aircraft and may be used in other applications as well.

FIG. 3 is a top view of the journal bearing 34 and the misaligned pin 30, where the shear plate 18 has been omitted in FIG. 3. The pin guide 48 is seated within the inner bore 54 of the inner bushing 46 and defines the opening 58 (FIG. 2), where the opening 58 is configured to receive the misaligned pin 30. In one embodiment, the pin guide 48 is constructed of a polymer such as nylon, and the bushings 44, 46 are constructed of a metal such as, for example, aluminum.

The misaligned pin 30 has a center axis C-C that is off-center or misaligned with respect to the center axis A-A of the opening 32 in the shear plate 18 (FIG. 2) and the axis of rotation R-R of the journal bearing 34. A misalignment distance 60 represents a distance between the axis of rotation R-R of the journal bearing 34 and the center axis C-C of the misaligned pin 30. As a result, the misaligned pin 30 exerts the pre-load force against the journal bearing 34, and the journal bearing 34 transfers the pre-load force onto the shear plate 18. The inner bushing 46 and the outer bushing 44 are both configured to rotate relative to one another to center the inner periphery 78 of the inner bushing 46 around the misaligned pin 30. As explained below, a keyed connection 70 exists between the pin guide 48 and the inner bushing 46. Accordingly, the pin guide 48 and the inner bushing 46 rotate together.

Figure 4:
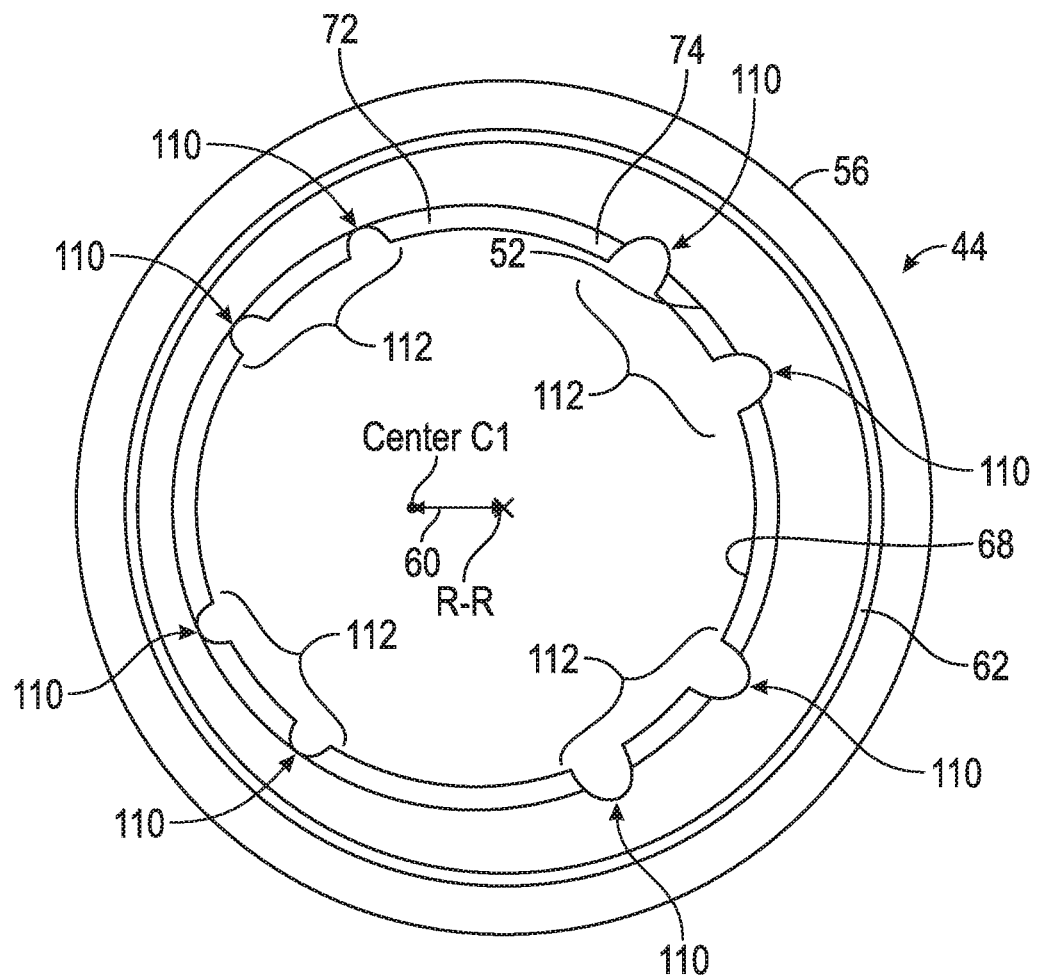
FIG. 4 is a top view of an outer bushing of the journal bearing, according to an exemplary embodiment.

FIG. 4 illustrates the outer bushing 44. As mentioned above, the outer bushing 44 includes the outer bore 52, the outer periphery 56, the outer counterbore 62, and an inner periphery 68. The inner periphery 68 surrounds the outer bore 52 of the outer bushing 44. The outer bore 52, the outer periphery 56, the outer counterbore 62, and the inner periphery 68 of the outer bushing 44 each include a circular profile. The outer periphery 56 and the outer counterbore 62 of the outer bushing 44 are both concentric relative to one another and are aligned with respect to the axis of rotation R-R of the journal bearing 34. However, the outer bore 52 of the outer bushing 44 is offset with respect to the axis of rotation R-R of the journal bearing 34 by the misalignment distance 60. Thus, a center C1 of the outer bore 52 of the outer bushing 44 is offset with respect to the axis of rotation R-R of the journal bearing 34. In other words, the outer bore 52 includes a circular profile, however, the outer bore 52 but is not centered within the outer bushing 44.

An outer lip 72 is disposed around the inner periphery 68 of the outer bushing 44 and surrounds the outer bore 52. The outer lip 72 creates a support surface 74. Referring to both FIGS. 2 and 4, the inner lip 64 of the inner bushing 46 is shaped to correspond with the outer lip 72 of the outer bushing 44. Accordingly, the inner lip 64 of the inner bushing 46 is seated against support surface 74 of the outer lip 72 of the outer bushing 44.

Referring to FIGS. 2, 3 and 4, the inner bushing 46 is configured to rotate within the outer bore 52 of the outer bushing 44 in either a clockwise or a counterclockwise direction within the outer bore 52 of the outer bushing 44. The outer bushing 44 is configured to rotate about the axis of rotation R-R of the journal bearing 34 in either the clockwise or the counterclockwise direction within the counterbore 40 of the shear plate 18. It is to be appreciated that the bushings 44, 46 may rotate relative to one another. For example, the outer bushing 44 may rotate while the inner bushing 46 stays stationary. Alternatively, the inner bushing 46 may rotate while the outer bushing 44 stays stationary. In another example, the outer bushing 44 may rotate in one direction, while the inner bushing 46 rotates in an opposite direction.

Figure 5:
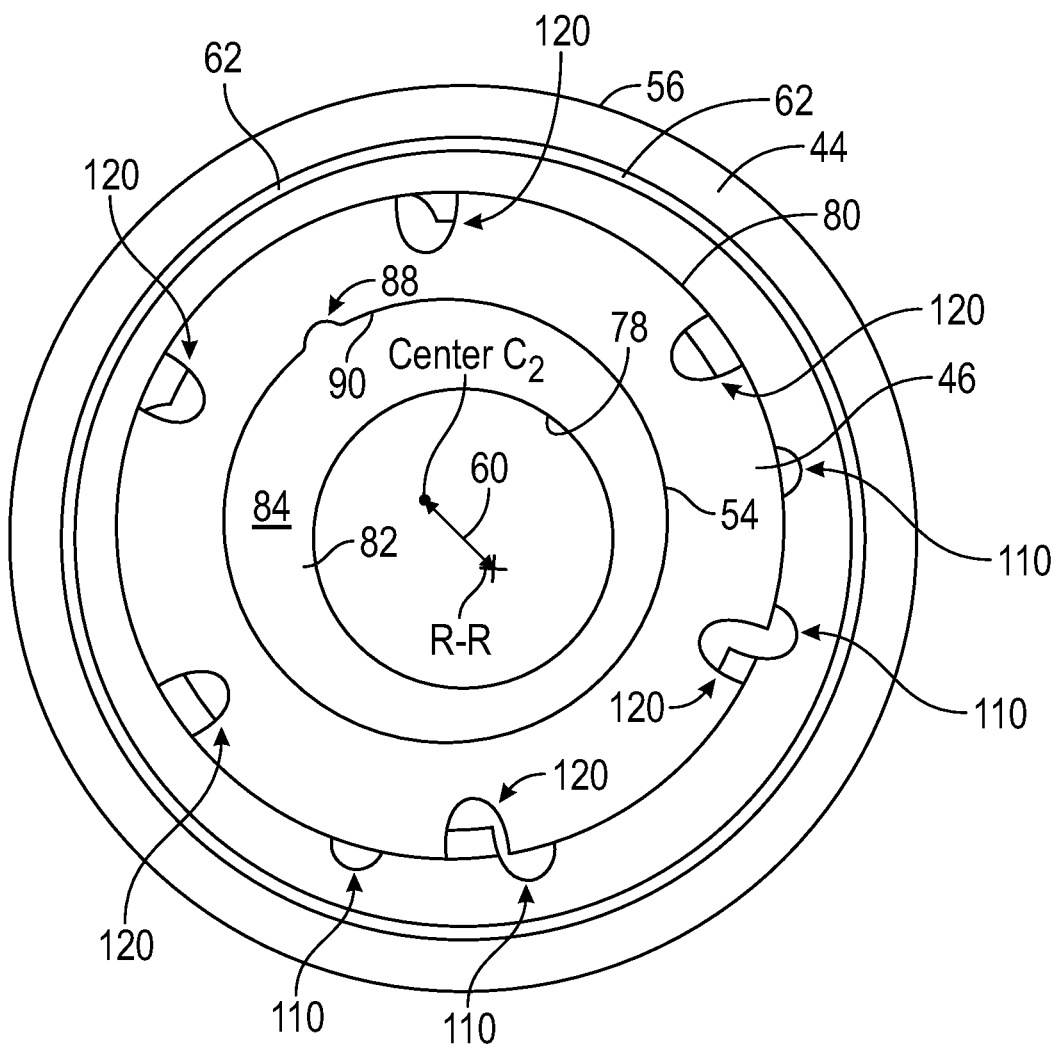
FIG. 5 is a top view of an inner bushing that is seated within the outer bushing of the journal bearing, according to an exemplary embodiment.

FIG. 5 illustrates the inner bushing 46 seated against the outer lip 72 of the outer bushing 44, where the pin guide 48 has been omitted. The inner bushing 46 includes the inner periphery 78, an outer periphery 80, the inner lip 64 (seen in FIG. 2), and the inner bore 54, where the inner periphery 78 surrounds the inner bore 54. Referring to both FIGS. 2 and 5, the inner lip 64 is disposed along a lower surface 132 of the inner bushing 46. The inner bore 54, the inner lip 64, the inner periphery 78, and the outer periphery 80 of the inner bushing 46 include a circular profile, and the inner bore 54 and the inner lip 64 are concentric with one another and centered within the inner bushing 46. However, the inner bushing 46 is offset with respect to the axis of rotation R-R of the journal bearing 34 by the misalignment distance 60. Specifically, a center C2 of the inner bore 54 of the inner bushing 46 is offset with respect to the axis of rotation R-R of the journal bearing 34 by the misalignment distance 60. In other words, the inner bore 54 of the inner bushing 46 includes a circular profile, however, the inner bore 54 is not aligned with respect to the axis of rotation R-R of the journal bearing 34.

An inner lip 82 is disposed around the inner periphery 78 of the inner bushing 46 and surrounds the inner bore 54. The inner lip 82 is shaped to correspond with the pin guide 48 (FIG. 3) to create a support surface 84. The pin guide 48 is seated against the inner lip 82 of the inner bushing 46 and against the support surface 84.

Figure 6:
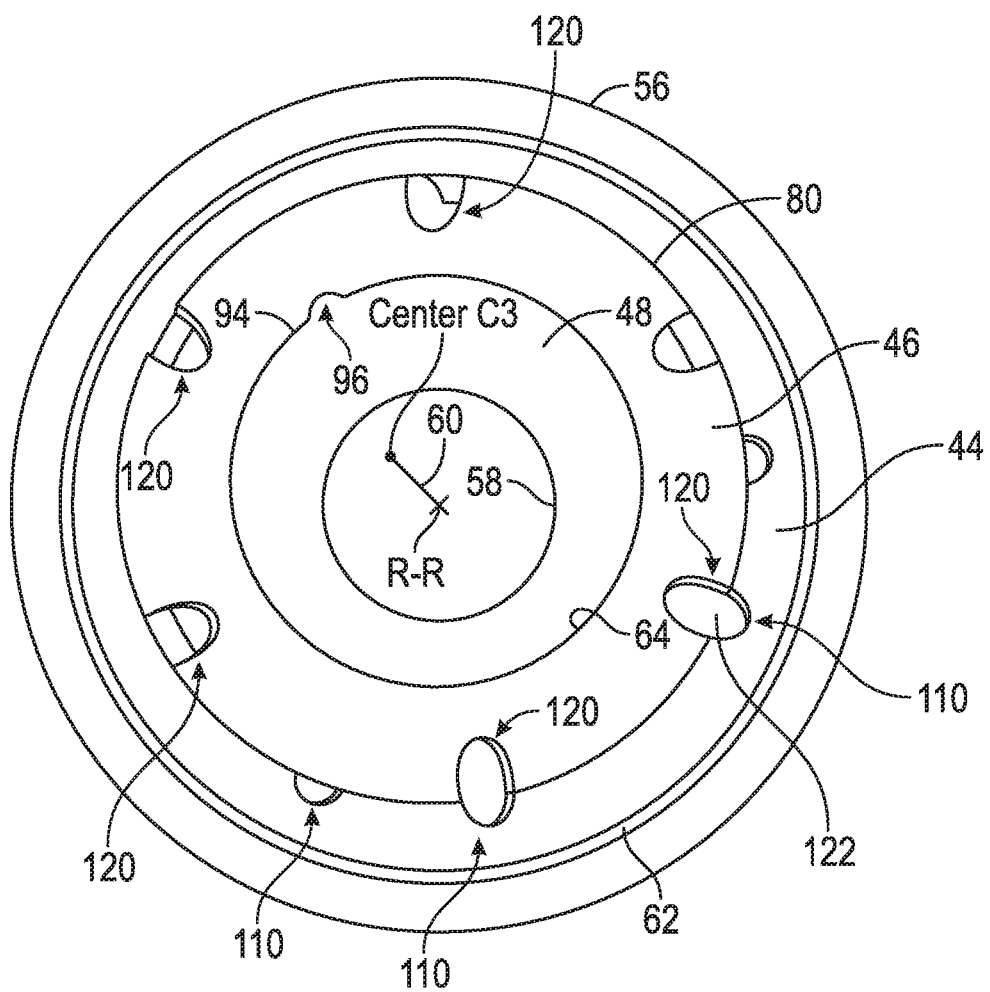
FIG. 6 is a top view of a pin guide that is seated within the inner bushing of the journal bearing, according to an exemplary embodiment.

As mentioned above, a keyed connection 70 (FIG. 3) exists between the pin guide 48 and the inner bushing 46. Specifically, a notch 88 is disposed around a periphery 90 of the inner bore 54 of the inner bushing 46. Referring to FIGS. 5 and 6, the pin guide 48 includes an outer periphery 94, where the outer periphery 94 of the pin guide 48 defines a key feature 96 that engages with the notch 88 of the inner bushing 46. The engagement between the key feature 96 of the pin guide 48 and the notch 88 of the inner bushing 46 prevent relative rotation between the pin guide 48 and the inner bushing 46. Accordingly, the inner bushing 46 and the pin guide 48 rotate in concert together.

FIG. 6 is an illustration of the outer bushing 44, the inner bushing 46, and the pin guide 48. The pin guide 48 includes the outer periphery 94 and the opening 58. The opening 58 and the outer periphery 94 of the pin guide 48 both include a circular profile, where the opening 58 of the pin guide 48 is shaped to receive the misaligned pin 30 (FIG. 3). The pin guide 48 includes a center C3 that is measured with respect to the outer periphery 94 of the pin guide 48. As seen in FIG. 6, the opening 58 is offset with respect to the center C3 of the pin guide 48 by the misalignment distance 60. Specifically, referring to FIG. 3, when the journal bearing 34 is assembled, the opening 58 is offset within the pin guide 48 by the misalignment distance 60.

Referring to FIG. 3, one or more first slots 110 are disposed around the inner periphery 68 of the outer bushing 44. In the non-limiting embodiment as shown in FIG. 3, the outer bushing 44 includes a total of eight first slots 110 disposed around the inner periphery 68 of the outer bushing 44. Specifically, the first slots 110 are arranged so as to create four pairs 112 of first slots 110. However, it is to be appreciated that FIG. 3 is merely exemplary in nature, and any number of arrangement of first slots 110 may be used as well.

Referring to FIG. 5, one or more second slots 120 are disposed around the outer periphery 80 of the inner bushing 46. In the exemplary embodiment as shown, the inner bushing 46 include six second slots 120 that are spaced equidistant to one another. However, any number and arrangement of second slots 120 may be used as well. Referring to FIG. 6, the first slots 110 of the outer bushing 44 and the second slots 120 of the inner bushing 46 align with one another to create an opening 122. Referring to FIGS. 2, 3, and 6, the journal bearing 34 further comprises a bolt 126 defining a shank 128 (visible in FIG. 2). An operator places the shank 128 of the bolt 126 into the opening 122 to prevent relative rotation between the inner bushing 46 and the outer bushing 44.

Referring back to FIG. 2, in one embodiment a plurality of tabs 130 are disposed around the lower surface 132 of the inner bushing 46. The plurality of tabs 130 project outward with respect to the lower surface 132 of the inner bushing 46. The plurality of tabs 130 provide a surface for an operator to grasp when rotating the inner bushing 46. In the non-limiting embodiment as shown in FIG. 2, the tabs 130 are each spaced equidistant from one another along the lower surface 132 of the inner bushing 46. However, the tabs 130 may be oriented in other configurations as well. Similarly, a plurality of tabs 136 are disposed around a lower surface 138 of the outer bushing 44, where the plurality of tabs 136 also provide a surface for an operator to grasp. The tabs 136 are also spaced equidistant from one another along the lower surface 138 of the outer bushing 44, however, other orientations for the tabs 136 may be used as well.

Referring to FIGS. 2 and 3, two bushing retainers 50 are provided for clamping the journal bearing 34 against the shear plate 18. In the non-limiting embodiment as shown in the figures, two bushing retainers 50 are spaced one hundred and eighty degrees apart from one another and are disposed around the outer periphery 56 of the outer bushing 44. The bushing retainers 50 clamp the outer bushing 44, inner bushing 46, and the pin guide 48 against the shear plate 18. Specifically, each bushing retainer 50 includes a retainer 133 and corresponding fasteners 134 which include a bolt 134 and a corresponding nut plate (not visible in the figures). The corresponding fasteners 134 are each received by corresponding openings in the retainer 133 (the openings are not visible in the figures) and corresponding openings 140 in the shear plate 18 (seen in FIG. 2). During assembly, an operator may first center the misaligned pin 30 and then clamp the inner and outer bushings 46, 44 against the shear plate 18 by tightening the corresponding fasteners 134 against their respective retainers 133.

Figure 7:
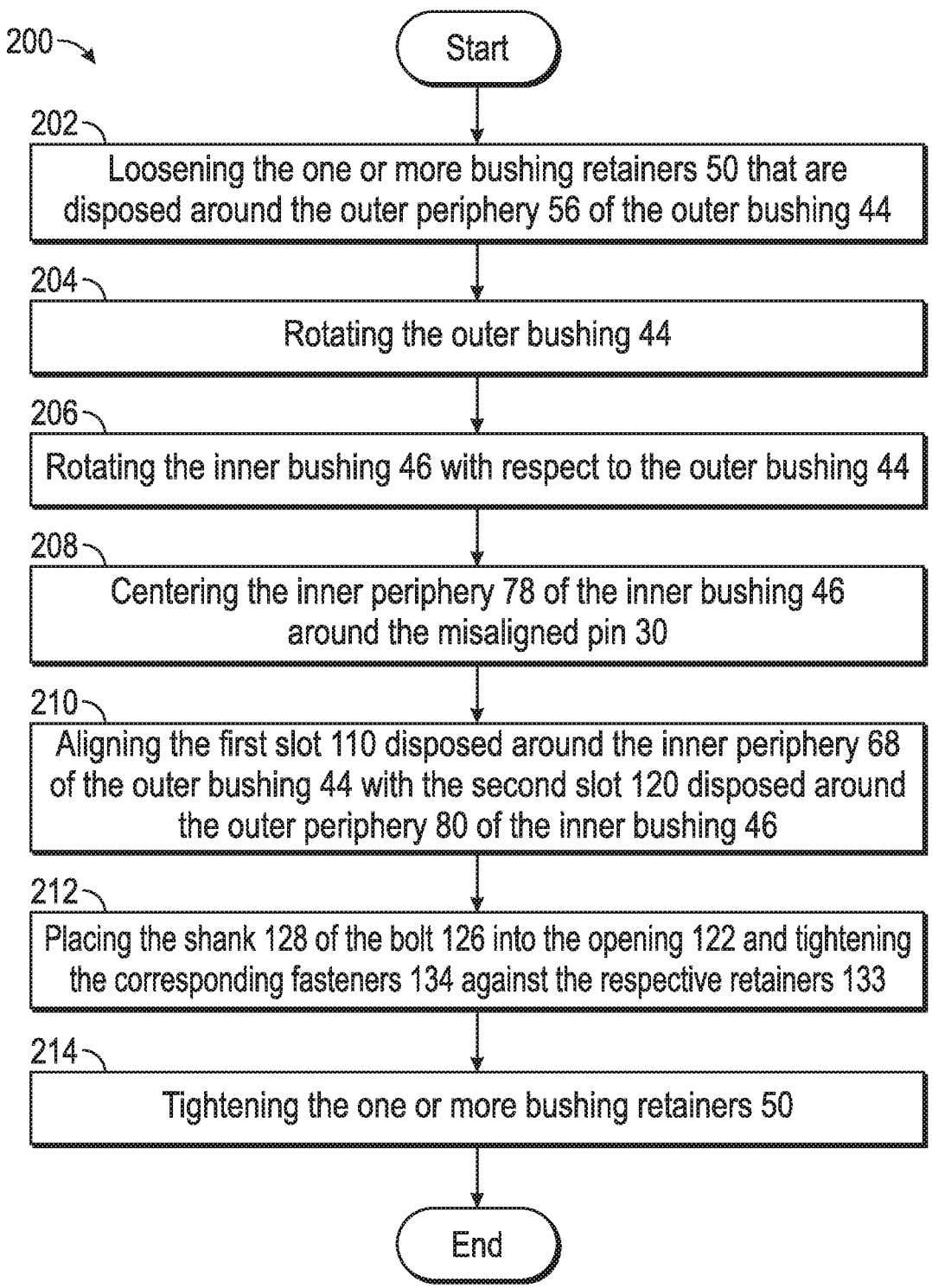
FIG. 7 is a process flow diagram illustrating a method for aligning a shear pin by the disclosed journal bearing, according to an exemplary embodiment.

FIG. 7 is an exemplary process flow diagram illustrating a method 200 of centering the inner periphery 78 of the inner bushing 46 around the misaligned pin 30 with the journal bearing 34. Referring to FIGS. 2, 3, and 7, the method may begin at block 202. In block 202, an operator loosens the one or more bushing retainers 50 that are disposed around the outer periphery 56 of the outer bushing 44 of the journal bearing 34. As mentioned above, the one or more bushing retainers 50 clamp the outer bushing 44, the inner bushing 46, and the pin guide 48 of the journal bearing 34 against the shear plate 18. The method 200 may then proceed to block 204.

In block 204, an operator rotates the outer bushing 44. As mentioned above, the outer bore 52 is offset with respect to the axis of rotation R-R of the journal bearing 34 by the misalignment distance 60, and the misalignment distance 60 represents a distance between the axis of rotation of the journal bearing R-R and the center axis C-C of the misaligned pin 30. The method 200 may then proceed to block 206.

In block 206, the operator rotates the inner bushing 46 relative to the outer bushing 44. The inner bore 54 offset with respect to the axis of rotation R-R of the journal bearing 34 by the misalignment distance 60, and the inner bushing 46 is seated against the outer lip 72 of the outer bushing 44. The method 200 may then proceed to block 208.

In block 208, the inner periphery 78 of the inner bushing 46 is centered around the misaligned pin 30. Centering the misaligned pin 30 removes the pre-load force against the shear plate 18. The method 200 may then proceed to block 210.

In block 210, the first slot 110 disposed around the inner periphery 68 of the outer bushing 44 is aligned with the second slot 120 disposed around the outer periphery 80 of the inner bushing 46 to create the opening 122 (seen in FIG. 6). The method 200 may then proceed to block 212.

In block 212, the operator places the shank 128 of the bolt 126 into the opening 122 created by the first slot 110 and the second slot 120 to prevent relative rotation between the inner bushing 46 and the outer bushing 44. The method 200 may then proceed to block 214.

In block 214, the operator tightens the one or more bushing retainers 50 disposed around the outer periphery 56 of the outer bushing 44 of the journal bearing 34. The method 200 may then terminate.

Referring generally to the figures, the disclosed journal bearing provides various technical effects and benefits. Specifically, the disclosed journal bearing provides an approach for aligning a shear pin with a corresponding opening in a plate without resulting in an additional clearance between the pin and the shear plate, which may lead to unpredictable dynamic loading. When misaligned, the shear pin exerts a pre-load force against the pin guide of the journal bearing. The pre-load force is transmitted from the pin guide to the inner bushing, from the inner bushing to the outer bushing, and from the outer bushing to the shear plate. Aligning the shear pin removes the pre-load force against the shear plate. Furthermore, the journal bearing is relatively easy for an operator to manipulate and does not require re-work like some other approaches that are presently available.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A journal bearing for centering a misaligned pin, the journal bearing comprising:
an outer bushing defining an outer bore including a circular profile, wherein the outer bore is offset with respect to an axis of rotation of the journal bearing by a misalignment distance, and the misalignment distance represents a distance between the axis of rotation of the journal bearing and a center axis of the misaligned pin;
an inner bushing defining an inner bore that includes a circular profile and an inner periphery that surrounds the inner bore, the inner bore offset with respect to the axis of rotation of the journal bearing by the misalignment distance, wherein the inner bushing is seated within the outer bore of the outer bushing and is completely surrounded by the outer bore of the outer bushing along an axial extent of the outer bushing, and wherein the inner bushing and the outer bushing are both configured to rotate relative to one another to center the inner periphery of the inner bushing around the misaligned pin; and
a pin guide seated within the inner bore of the inner bushing, the pin guide defining an opening configured to receive the misaligned pin, wherein a key feature exists between the pin guide and the inner bushing to prevent relative rotation between the pin guide and the inner bushing, and the key feature allows the pin guide and the inner bushing to rotate in concert together.

2. The journal bearing of claim 1, wherein the inner bushing defines an inner lip that surrounds the inner bore, and wherein the pin guide is seated against the inner lip of the inner bushing.

3. The journal bearing of claim 2, wherein the inner bore of the inner bushing defines a notch, and wherein an outer periphery of the pin guide defines the key feature that engages with the notch of the inner bushing to prevent relative rotation between the pin guide and the inner bushing.

4. The journal bearing of claim 1, wherein the outer bushing defines an outer lip that surrounds the outer bore and the inner bushing defines an inner lip, and wherein the inner lip of the inner bushing is seated against the outer lip of the outer bushing.

5. The journal bearing of claim 1, wherein one or more first slots are disposed around an inner periphery of the outer bushing.

6. The journal bearing of claim 5, wherein one or more second slots are disposed around an outer periphery of the inner bushing, and wherein the first slots of the outer bushing and the second slots of the inner bushing align with one another to create an opening.

7. The journal bearing of claim 6, further comprising a bolt defining a shank, wherein the shank of the bolt is placed into the opening to prevent relative rotation between the inner bushing and the outer bushing.

8. The journal bearing of claim 1, further comprising a plurality of tabs disposed around a lower surface of the inner bushing, wherein the plurality of tabs provide a surface for an operator to grasp.

9. The journal bearing of claim 1, further comprising a plurality of tabs disposed around a lower surface of the outer bushing, wherein the plurality of tabs provide a surface for an operator to grasp.

10. The journal bearing of claim 1, wherein the inner bushing and the outer bushing are constructed of metal and the pin guide is constructed of a polymer.

11. The journal bearing of claim 10, wherein the metal is aluminum and the polymer is nylon.

12. A journal bearing assembly, comprising:
   a misaligned pin having a center axis;
   a shear plate defining an opening for receiving the misaligned pin and a counterbore that surrounds the opening; and
   a journal bearing, comprising:
      an outer bushing seated within the counterbore of the shear plate, wherein the outer bushing defines an outer bore having a circular profile that is offset with respect to an axis of rotation of the journal bearing by a misalignment distance, and the misalignment distance represents a distance between the axis of rotation of the journal bearing and the center axis of the misaligned pin;
      an inner bushing defining an inner bore including a circular profile and an inner periphery that surrounds the inner bore, the inner bore offset with respect to the axis of rotation of the journal bearing by the misalignment distance, wherein the inner bushing is seated within the outer bore of the outer bushing and is completely surrounded by the outer bore of the outer bushing along an axial extent of the outer bushing, and wherein the inner bushing and the outer bushing are both configured to rotate relative to one another to center the inner periphery of the inner bushing around the misaligned pin and remove a pre-load force against the shear plate; and
      a pin guide seated within the inner bore of the inner bushing, the pin guide defining an opening configured to receive the misaligned pin, wherein a key feature exists between the pin guide and the inner bushing to prevent relative rotation between the pin guide and the inner bushing, and the key feature allows the pin guide and the inner bushing to rotate in concert together.

13. The journal bearing assembly of claim 12, wherein the inner bushing defines an inner lip that surrounds the inner bore, and wherein the pin guide is seated against the inner lip of the inner bushing.

14. The journal bearing assembly of claim 13, wherein the inner bore of the inner bushing defines a notch, and wherein an outer periphery of the pin guide defines the key feature that engages with the notch of the inner bushing to prevent relative rotation between the pin guide and the inner bushing.

15. The journal bearing assembly of claim 12, wherein the outer bushing defines an outer lip that surrounds the outer bore and the inner bushing defines an inner lip, and wherein the inner lip of the inner bushing is seated against the outer lip of the outer bushing.

16. The journal bearing assembly of claim 12, further comprising one or more bushing retainers disposed around an outer periphery of the outer bushing, wherein the bushing retainers clamp the outer bushing and the inner bushing against the shear plate.

17. The journal bearing assembly of claim 16, further comprising a corresponding fastener that is provided for each bushing retainer, wherein the corresponding fastener is received by corresponding openings in the shear plate.

18. The journal bearing assembly of claim 12, wherein the inner bushing and the outer bushing are constructed of metal and the pin guide is constructed of a polymer.

19. A method of centering a misaligned pin with a journal bearing, the method comprising:
   loosening one or more bushing retainers that are disposed around an outer periphery of an outer bushing having a circular profile of the journal bearing, wherein the one or more bushing retainers clamp the outer bushing and an inner bushing against a shear plate;
   rotating the outer bushing, wherein an outer bore is offset with respect to an axis of rotation of the journal bearing by a misalignment distance, and the misalignment distance represents a distance between an axis of rotation of the journal bearing and a center axis of the misaligned pin;
   rotating an inner bushing relative to the outer bushing, wherein an inner bore of the inner bushing includes a circular profile and is offset with respect to the axis of rotation of the journal bearing by the misalignment distance, wherein the inner bushing is seated within the outer bore of the outer bushing and is completely surrounded by the outer bore of the outer bushing along an axial extent of the outer bushing, and wherein a pin guide is seated within the inner bore of the inner bushing and defines an opening configured to receive the misaligned pin, and wherein a key feature exists between the pin guide and the inner bushing to prevent relative rotation between the pin guide and the inner bushing, and the key feature allows the pin guide and the inner bushing to rotate in concert together;
   centering an inner periphery of the inner bushing around the misaligned pin, wherein centering the misaligned pin removes a pre-load force against the shear plate; and
   tightening the one or more bushing retainers disposed around the outer periphery of the outer bushing of the journal bearing.

20. The method of claim 19, further comprising:
   aligning a first slot disposed around an inner periphery of the outer bore of the outer bushing with a second slot disposed around an outer periphery of the inner bushing to create an opening; and
   placing a shank of a bolt into the opening created by the first slot and the second slot to prevent relative rotation between the inner bushing and the outer bushing.

* * * * *